US009853555B2

United States Patent
Ramabhadran et al.

(10) Patent No.: US 9,853,555 B2
(45) Date of Patent: Dec. 26, 2017

(54) UNIVERSAL POWER ADAPTER AND AN ASSOCIATED METHOD THEREOF

(71) Applicant: General Electric Company, Schenectady, NY (US)

(72) Inventors: Ramanujam Ramabhadran, Niskayuna, NY (US); Han Peng, Rexford, NY (US); Yehuda Daniel Levy, Jerusalem (IL); John Stanley Glaser, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 300 days.

(21) Appl. No.: 14/856,657

(22) Filed: Sep. 17, 2015

(65) Prior Publication Data

US 2017/0085186 A1  Mar. 23, 2017

(51) Int. Cl.
*H02M 7/5383* (2007.01)
*H02M 3/335* (2006.01)
*H05B 37/02* (2006.01)
*H02M 1/00* (2006.01)

(52) U.S. Cl.
CPC ........ *H02M 3/33546* (2013.01); *H05B 37/02* (2013.01); *H02M 2001/0058* (2013.01); *Y02B 70/1491* (2013.01)

(58) Field of Classification Search
CPC ........ H02M 3/325; H02M 3/335; H02M 3/28; H02M 3/33569; H02M 2007/4815; H02M 2007/4818; H02M 1/083; H02M 3/33507; H02M 3/33538; H02M 3/33546
See application file for complete search history.

(56) References Cited

U.S. PATENT DOCUMENTS

| 5,513,088 A | 4/1996 | Williamson |
| 8,300,426 B2 | 10/2012 | Alexander |
| 8,436,593 B2 | 5/2013 | Shao et al. |

(Continued)

OTHER PUBLICATIONS

Goren et al.,"New unified high power factor series resonant converters with variable tank", Power Electronics Specialists Conference, PESC 98 Record. 29th Annual IEEE, vol. 1, May 1998, pp. 758-762.

(Continued)

*Primary Examiner* — Adolf Berhane
*Assistant Examiner* — Afework Demisse
(74) *Attorney, Agent, or Firm* — Nitin N. Joshi (57) ABSTRACT

A universal power adapter includes a power converter configured to generate an output power based on a switching frequency of the power converter. The universal power adapter also includes a frequency controller operatively coupled to the power converter and configured to control the switching frequency of the power converter. The universal power adapter further includes a switch capacitor circuit having a plurality of capacitive elements, operatively coupled to the power converter. The switch capacitor circuit is configured to switch between the plurality of capacitive elements. The universal power adapter also includes a capacitance controller operatively coupled to the switch capacitor circuit and configured to control the switch capacitor circuit to control switching between the plurality of capacitive elements to maintain a control parameter within a threshold range of.

20 Claims, 5 Drawing Sheets

(56) References Cited

U.S. PATENT DOCUMENTS

| | | | |
|---|---|---|---|
| 8,493,753 B2 | 7/2013 | Lai et al. | |
| 8,605,464 B2 * | 12/2013 | Sase | H02M 1/4258 |
| | | | 363/21.02 |
| 8,699,248 B2 | 4/2014 | Perreault et al. | |
| 9,426,854 B1 * | 8/2016 | Ramabhadran | H05B 33/0815 |
| 2014/0055055 A1 | 2/2014 | Melanson et al. | |
| 2014/0119060 A1 | 5/2014 | Zhu et al. | |

OTHER PUBLICATIONS

Walker, "Wide Range Inputs in Switched-Mode Power Supply Units", Puls power, downloaded from "http://www.pulspower.com/pdf/26_2004_04_wide_range_eingaenge_en.pdf", Apr. 2004, 4 Pages.

* cited by examiner

UNIVERSAL POWER ADAPTER AND AN ASSOCIATED METHOD THEREOF

BACKGROUND

Embodiments of the present invention relate to power converters, and more particularly to a universal power adapter which can operate within a range of input voltages.

Power adapters are often used to provide an input power to a device for operating the device. The power adapters often include power converters which convert the power fed from a power source based on a device specific power requirement.

Conventional power adapters are designed to convert power from a specific power source. However, the power available from the power source may change at different geographical locations based on regulatory requirements. In such situations, the conventional power adapters generate undesirable switching losses or audible noise. In one approach, the conventional power adapters may include a manual switch which is used to configure the power adapter to operate with different power sources. However, such an approach requires manual effort and is subject to human error.

Furthermore, different devices having different power requirements may be used with the same power adapter. In such situations, the power adapter may need to deliver different output powers based on the different power requirements of the devices. The power adapter alters a switching frequency of the power adapter to vary the output power based on the different power requirements. However, such variations in the switching frequency lead to undesirable switching losses or audible noise.

BRIEF DESCRIPTION

Briefly, in accordance with one embodiment, a universal power adapter is provided. The universal power adapter includes a power converter configured to generate an output power based on a switching frequency of the power converter. The universal power adapter also includes a frequency controller operatively coupled to the power converter and configured to control the switching frequency of the power converter. The universal power adapter further includes a switch capacitor circuit comprising a plurality of capacitive elements, operatively coupled to the power converter. The switch capacitor circuit is configured to switch between the plurality of capacitive elements. The universal power adapter also includes a capacitance controller operatively coupled to the switch capacitor circuit and configured to control the switch capacitor circuit to control switching between the plurality of capacitive elements to maintain a control parameter within a threshold range.

In another embodiment, a method for providing an output power from a universal power adapter is provided. The method includes generating the output power, using a power converter, based on a switching frequency of the power converter. The method also includes detecting an output power parameter from the output power, using a sensor. The method further includes computing a control parameter based on a reference parameter and the output power parameter. The method also includes determining if the control parameter is greater than a maximum value of a threshold range or less than a minimum value of the threshold range. The method further includes generating a capacitance switching command if the control parameter is greater than the maximum value of the threshold range or less than the minimum value of the threshold range. The method also includes switching between a first capacitive element and a second capacitive element based on the capacitance switching command to maintain the control parameter within the threshold range.

In yet another embodiment, a lighting system is provided. The lighting system includes a universal power adapter. The universal power adapter includes a power converter configured to generate an output power based on a switching frequency of the power converter. The universal power adapter also includes a frequency controller operatively coupled to the power converter and configured to control the switching frequency of the power converter. The universal power adapter further includes a switch capacitor circuit comprising a plurality of capacitive elements, operatively coupled to the power converter. The switch capacitor circuit is configured to switch between the plurality of capacitive elements. The universal power adapter also includes a capacitance controller operatively coupled to the switch capacitor circuit and configured to control the switch capacitor circuit to control switching between the plurality of capacitive elements to maintain a control parameter within a threshold range. The lighting system also includes an illumination device operatively coupled to the universal power adapter, wherein the universal power adapter is configured to provide the output power to the illumination device.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments of the present invention include a universal power adapter and a method for providing power from the universal power adapter. The universal power adapter includes a power converter configured to generate an output power based on a switching frequency of the power converter. The universal power adapter also includes a frequency controller operatively coupled to the power converter and configured to control the switching frequency of the power converter. The universal power adapter further includes a switch capacitor circuit having a plurality of capacitive elements, operatively coupled to the power converter. The switch capacitor circuit is configured to switch between the plurality of capacitive elements. The universal power adapter also includes a capacitance controller operatively coupled to the switch capacitor circuit and configured to control the switch capacitor circuit to control switching between the plurality of capacitive elements to maintain a control parameter within a threshold range.

As used herein, the terms "frequency controller" and "capacitance controller" may include at least one arithmetic logic unit, microprocessor, general purpose controller or other processor arrays configured to perform computations, and/or retrieve data stored in the memory. In one embodiment, the frequency controller and the capacitance controller may be a multiple core processor. The frequency controller and the capacitance controller process data signals and may include various computing architectures including a complex instruction set computer (CISC) architecture, a reduced instruction set computer (RISC) architecture, or an architecture implementing a combination of instruction sets. In one embodiment, the processing capability of the frequency controller and the capacitance controller may support the retrieval of data and transmission of data. In another embodiment, the processing capability of the frequency controller and the capacitance controller may also perform more complex tasks, including various types of feature extraction, modulating, encoding, multiplexing, and the like. Other type of processors, operating systems, and physical configurations are also envisioned. In another embodiment, the frequency controller and the capacitance controller may be integrated together to form a single controller configured to control both the frequency and the capacitance of the universal power adapter.

Figure 1:
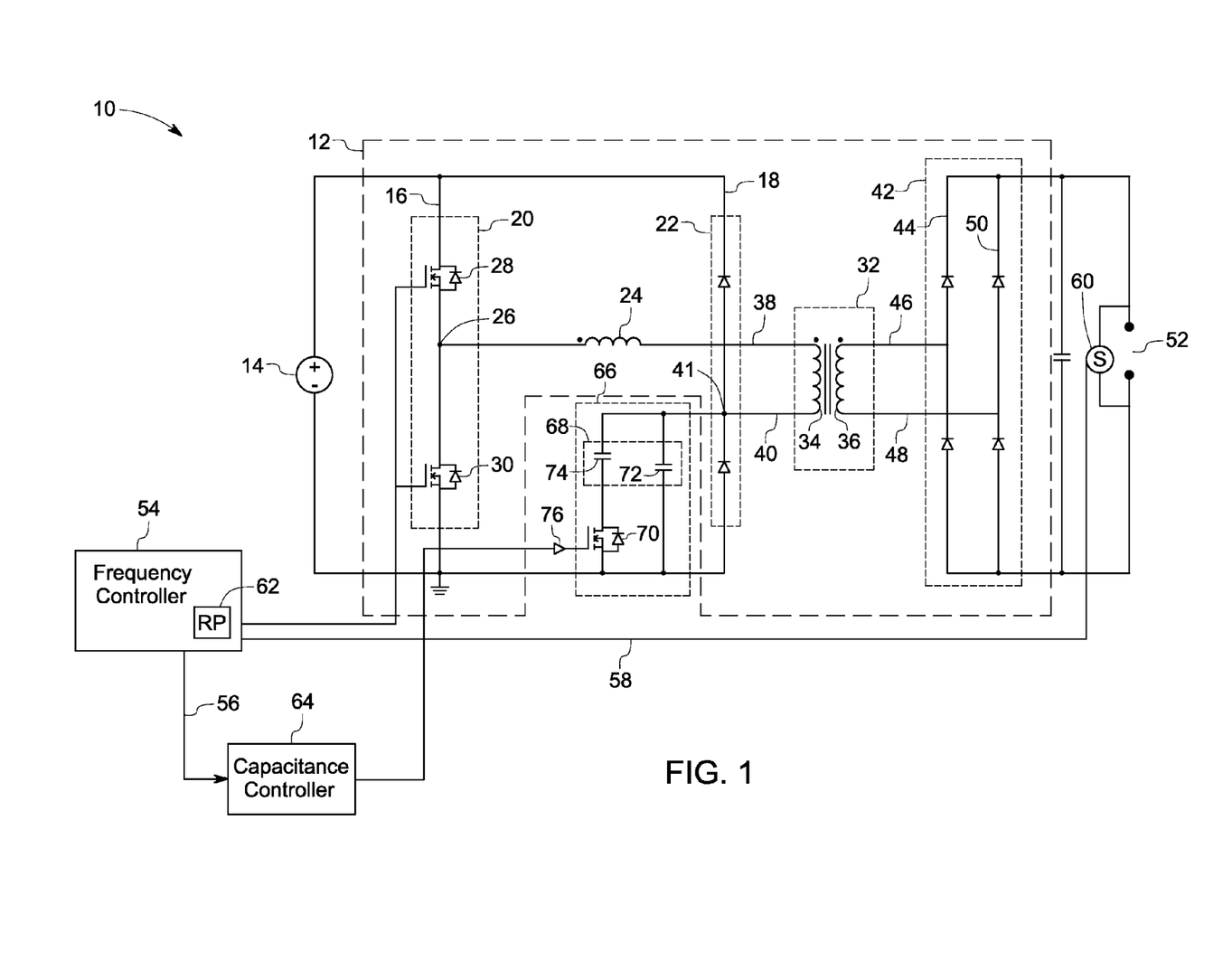
FIG. 1 is a schematic representation of a universal power adapter in accordance with an embodiment of the invention.

FIG. 1 is a schematic representation of a universal power adapter 10 in accordance with an embodiment of the invention. The universal power adapter 10 includes a power converter 12 operatively coupled to a power source 14. In one embodiment, the power source 14 may include a direct current (DC) power source or an alternating current (AC) power source. In embodiments where the power source 14 is a DC power source, a DC input power is transmitted from the power source 14 to the power converter 12. In other embodiments in which the power source 14 is an AC power source, a rectifier (not shown) may be operatively coupled to the power converter 12 such that an AC power received from the power source 14 is then converted to the DC power by the rectifier and then fed to the power converter 12.

Furthermore, the power converter 12 includes a first string 16 and a second string 18. The first string 16 includes a plurality of switches 20 operatively coupled to each other in a series configuration. The second string 18 includes a plurality of diodes 22 operatively coupled to each other in a series configuration. Furthermore, the first string 16 and the second string 18 are operatively coupled to each other in a parallel configuration. The power converter 12 further includes a resonant inductor 24 operatively coupled to the first string 16 at a first node 26. In operation, the power converter 12 receives the DC input power and converts the DC input power to an intermediate AC power based on operation of the plurality of switches 20 in the first string 16 and the resonant inductor 24.

The plurality of switches 20 in the first string 16 includes a first switch 28 and a second switch 30. The first switch 28 and the second switch 30 transition between a conducting state and a non-conducting state based on a switching frequency of the power converter 12 and a predetermined modulation technique. The transition of the first switch 28 and the second switch 30 between the conducting state and the non-conducting state charges and discharges the resonant inductor 24, thereby generating AC current pulses in the power converter 12. The power converter 12 also includes a transformer 32 operatively coupled to the resonant inductor 24. The transformer 32 includes a primary winding 34 and a secondary winding 36. The primary winding 34 includes a first end 38 operatively coupled to the resonant inductor 24 in a series configuration such that the resonant inductor 24 is operatively coupled between the first string 16 and the primary winding 34. The primary winding 34 also includes a second end 40 operatively coupled to the second string 18 at a second node 41. The primary winding 34 receives the AC current pulses from the resonant inductor 24. Specifically, the AC current pulses flow from the first end 38 to the second end 40 of the primary winding 34. The flow of AC current pulses in the primary winding 34 generates corresponding AC current pulses in the secondary winding 36 due to magnetic coupling between the primary winding 34 and the secondary winding 36. In one embodiment, the primary winding 34 and the secondary winding 36 include a predetermined ratio of turns. The magnitude of the corresponding AC current pulses generated in the secondary winding 36 is based on the predetermined ratio of turns of the primary winding 34 and the secondary winding 36. The power converter 12 includes a rectifier 42 operatively coupled to the secondary winding 36. The rectifier 42 includes a first leg 44 operatively coupled to a first end 46 of the secondary winding 36 and a second leg 50 operatively coupled to a second end 48 of the secondary winding 36. The corresponding AC pulses generated in the secondary winding 36 are converted to an output DC current by the rectifier 42. The output DC current is used to provide output power at an output terminal 52 of the universal power adapter 10. In one embodiment, the output power may include a DC output power or an AC output power based on a load operatively coupled to the universal power adapter 10. In some embodiments, the universal power adapter 10 may be modified to be compliant with the AC load.

The output power available at the output terminal 52 of the universal power adapter 10 is based on an input voltage provided by the power source 14, the switching frequency of the power converter 12, and a total capacitance of the universal power adapter 10. Moreover, the output power is also dependent on a load (not shown) operatively coupled to the universal power adapter 10 because the load draws output power from the universal power adapter 10 based on a power rating of the load. A relation between the output power, the input voltage, the switching frequency, and the total capacitance may be represented as:

$$P=CV^2F \quad (1)$$

where, the output power is represented as P, the total capacitance is represented as C, the input voltage is represented as V, and the switching frequency is represented as F.

The input voltage of the power source 14 may change based on a geographical location. In such situations, for example, if the load operatively coupled to the universal power adapter 10 remains constant, the output power required by the load is constant and the universal power adapter 10 needs to adapt to the input voltage to provide the desired output power. In another example, different loads having different power ratings in the same geographical location may be coupled to the universal power adapter 10. In such situations, the input voltage remains constant but the output power generated by the universal power adapter 10 needs to match the power ratings of the different loads.

As understood from equation (1), any change in the input voltage or the power rating of the load operatively coupled to the universal power adapter 10 affects the output power of the universal power adapter 10. However, the input voltage provided to the power source 14 and the load are independent of the universal power adapter 10. Therefore, the universal power adapter 10 needs to adapt to the available power source 14 and the load to provide the output power to the load according to the power rating of the load.

The universal power adapter 10 includes a frequency controller 54 operatively coupled to the power converter 12 and configured to control the switching frequency of the power converter 12. The frequency controller 54 is configured to generate a control parameter 56 based at least on an output power parameter 58 detected by a sensor 60. In one embodiment, the control parameter 56 is computed based on a reference parameter 62 and the output power parameter 58. In another embodiment, the control parameter 56 is representative of a control voltage or a control current, the reference parameter 62 is representative of a reference voltage or a reference current, and the output power parameter is representative of an output voltage or an output current.

In one embodiment, the frequency controller 54 may include a memory (not shown) configured to store the reference parameter 62. The reference parameter 62 may be predetermined during a design stage of the universal power adapter 10 or may be provided by a user of the universal power adapter 10. In some embodiments, a plurality of reference parameters is stored in the memory of the frequency controller 54 and the user may choose one reference parameter 62 based on the user's requirements. In one embodiment, the reference parameter 62 may be determined based on a range of output power that can be provided by the universal power adapter 10.

The frequency controller 54 receives the output parameter 58 from the sensor 60 and then determines an error between the output parameter 58 and the reference parameter 62. Furthermore, the frequency controller 54 computes the control parameter 56 based on the error and a predefined saturation curve. The frequency controller 54 includes the predefined saturation curve that is used to compute the control parameter 56 based on the error. The saturation curve depicts a variation of predetermined range of switching frequencies of the power converter 12 with respect to the error. In one embodiment, the predetermined range of the switching frequencies may include a range of acceptable switching frequency which does not generate audible noise and undesirable switching losses in the universal power adapter 10 upon coupling different loads with different power ratings. The switching frequency of the power converter 12 changes with a corresponding change in error up to a predefined value of the error, after which, the switching frequency saturates and does not change with respect to the error. Such predefined values of error and the respective switching frequencies are used to compute a threshold range of the control parameter 56. In one embodiment, the threshold range of the control parameter 56 is representative of a threshold range of a control voltage or a control current. In another embodiment, the threshold range of the control parameter 56 may include a range of the control parameter 56 within which the universal power adapter 10 is configured to deliver the output power based on the switching frequency. The frequency controller 54 alters the switching frequency of the power converter 12 to provide the desired output power at the output terminal 54 of the universal power adapter 10.

The power converter 12 has the capacity to provide desired output power till the control parameter 56 is within the threshold range of the control parameter 56. In situations where the control parameter 56 is greater than a maximum value of the threshold range of the control parameter 56 or less than a minimum value of the threshold range, the universal power adapter 10 employs a capacitance controller 64. The capacitance controller 64 controls a switch capacitor circuit 66 in the universal power adapter 10 to maintain the control parameter 56 within the threshold range.

The switch capacitor circuit 66 is operatively coupled to the second end 40 of the primary winding 34 of the transformer 32. The switch capacitor circuit 66 includes a plurality of capacitive elements 68 and a control switch 70. The capacitance controller 64 is operatively coupled to the control switch 70. The capacitance controller 64 controls gate pulses provided to the control switch 70 which in turn controls the switch capacitor circuit 66 to switch between the plurality of capacitive elements 68. In one embodiment, the plurality of capacitive elements 68 include a first capacitive element 72 and a second capacitive element 74. The first capacitive element 72 and the second capacitive element 74 have a predetermined ratio of capacitance.

During normal operations, when the control parameter 56 is within the threshold range, the control switch 70 is in a non-conducting state which allows the AC current pulses generated by the resonant inductor 24 to flow through the primary winding 34 and the first capacitive element 72. In such a situation, the total capacitance of the power converter 12 includes the capacitance of the first capacitive element 72. In situations, when the control parameter 56 is greater or lower than the threshold range, the capacitance controller 64 generates a capacitance switching command 76. The capacitance switching command 76 is representative of a gate pulse that is generated to switch the control switch 70 from the non-conducting state to a conducting state. The gate pulse triggers the control switch 70 to switch to the conducting state which increases the total capacitance of the power converter 12 to include the capacitance of the second capacitive element 74 in addition to the first capacitive element 72. In accordance with the aforementioned equation (1), the output power is directly affected by a change in the total capacitance of the power converter 12. Therefore, if the total capacitance of the power converter 12 is increased, the switching frequency of the power converter 12 can be reduced proportionally to provide the constant output power. The operation of the power converter 12, the frequency controller 54, the switch capacitor circuit 66 and the capacitance controller 64 is explained in detail with respect to FIG. 2.

Figure 2:
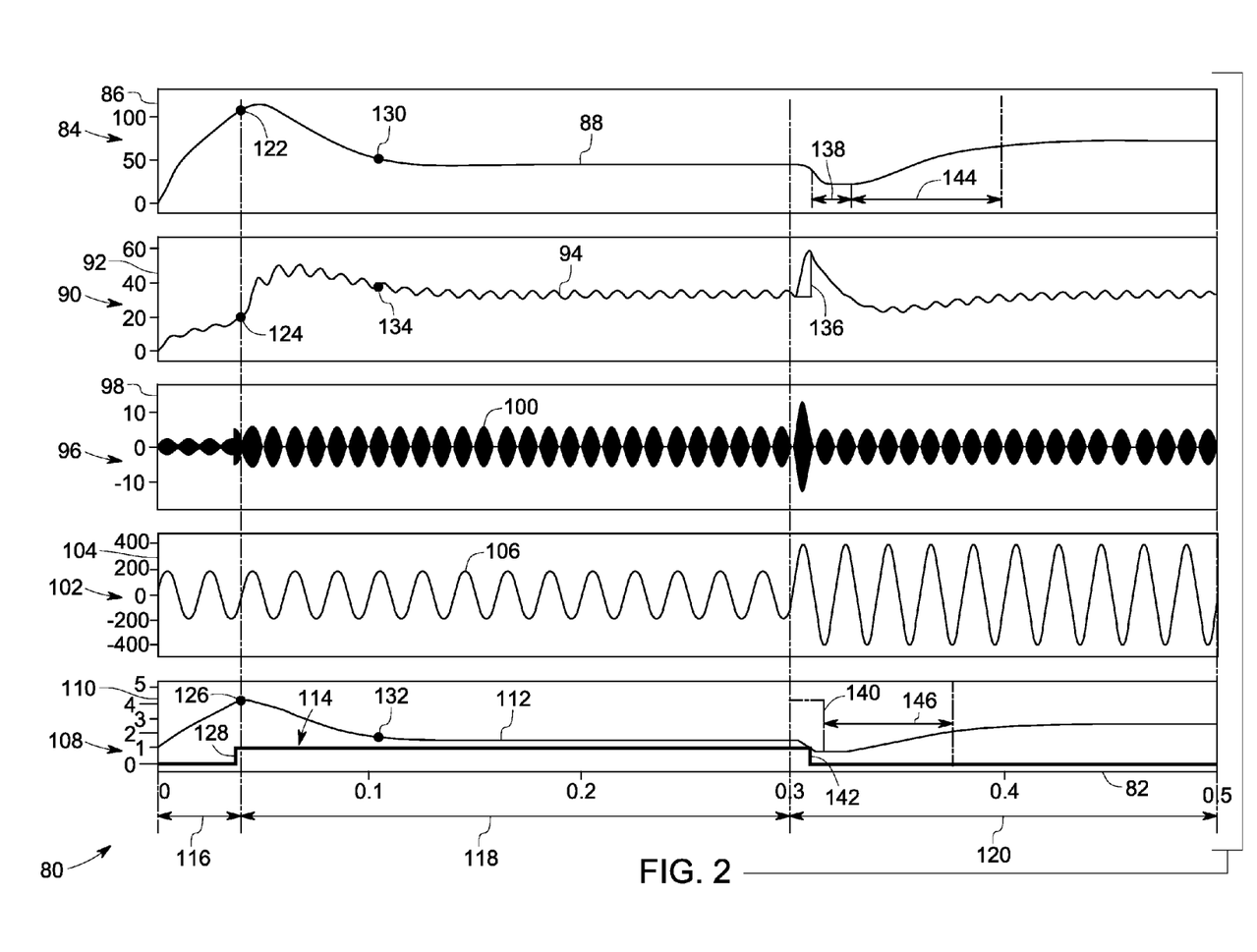
FIG. 2 is an illustrative graphical representation of operating a universal power adapter in accordance with an embodiment of the invention.

FIG. 2 is an illustrative graphical representation 80 of an operation of the power converter depicting the switching between the plurality of capacitive elements to maintain the control parameter within the threshold range in accordance with an embodiment of the invention. The graphical representation 80 includes an X-axis 82 representative of time in seconds.

The graphical representation 80 further includes a first graph section 84 having a Y-axis 86 depicting the switching frequency in Kilohertz. The first graph section 84 includes a first curve 88 depicting variations in the switching frequency.

The graphical representation 80 further includes a second graph section 90 having a Y-axis 92 depicting the output voltage at the output terminal in volts. The second graph section 90 includes a second curve 94 depicting variations in the output voltage.

The graphical representation 80 further includes a third graph section 96 having a Y-axis 98 depicting the AC current pulses generated by the resonant inductor in amperes. The third graph section 96 includes a third curve 100 depicting variation in the AC current pulses.

The graphical representation 80 further includes a fourth graph section 102 having a Y-axis 104 depicting the input voltage provided by the power source in volts. The fourth graph section 102 includes a fourth curve 106 depicting variations in the input voltage.

The graphical representation 80 also includes a fifth graph section 108 having a Y-axis 110 depicting the control parameter representative of the control voltage in volts. The fifth graph section 108 includes a fifth curve 112 depicting the variation in control voltage and a sixth curve 114 depicting the variation in capacitance switching command.

The X-axis 82 depicts a first time interval 116 including a time period of zero (0) seconds to zero point zero five (0.05) seconds, a second time interval 118 including a time period of zero point zero five (0.05) seconds to zero point three (0.3) seconds, and a third time interval 120 including a time period of zero point three (0.3) seconds to zero point five (0.5) seconds.

During the first time interval 116, a load having a voltage rating of forty volts is operatively coupled to the universal power adapter. Furthermore, the universal power adapter is operatively coupled to a power source configured to provide the AC input voltage of two hundred volts to the universal power adapter. The threshold range of the control voltage of the universal power adapter is one volt to four volts. Furthermore, only the first capacitive element is operatively coupled to the power converter.

During the first time interval, upon coupling the universal power adapter to the power source and the load, the power converter of the universal power adapter generates the output voltage of forty volts because the load draws the output power based on the voltage rating. The frequency controller increases the switching frequency to a point 122 in the first curve 88 in order to generate the output voltage of forty volts as depicted by point 124 in the second curve 94 of the second graph section 90.

At time instant of zero point zero five (0.05) seconds, the control voltage represented by a point 126 in the fifth curve 112, is equal to a maximum value of the threshold range of the control voltage. Therefore, the capacitance controller generates a first capacitance switching command as depicted by a point 128 in the sixth curve 114. The capacitance controller generates a gate pulse representative of the first capacitance switching command which triggers the control switch in the switch capacitor circuit to switch to a conducting state. The change of state of the control switch to the conducting state increases the total capacitance of the power converter by operatively coupling the second capacitive element to the power converter. Such an increase in the total capacitance of the power converter enables the frequency controller to reduce the switching frequency as represented by a point 130 in the first curve 88. The reduction in the switching frequency facilitates to reduce the control voltage in the power converter as represented by a point 132 while maintaining the output voltage near forty volts as represented by a point 134.

Furthermore, during the third time interval 120, the load which is operatively coupled to the universal power adapter remains constant but the power source is changed/modified to provide an AC input voltage of four hundred volts. Therefore, the universal power adapter is required to adapt to such a situation and provide the output voltage of forty volts from the power source providing four hundred volts, which is twice the AC input voltage provided by the power source during the first time interval 116 and the second time interval 118.

As shown by section 136 of the second curve 94, the output voltage suddenly peaks to sixty volts due to sudden increase in the AC input voltage. In response, the frequency controller reduces the switching frequency to match the output power of forty volts as shown by section 138 of the first curve 88. The control voltage also reduces with the switching frequency to a value lower than the minimum value of the threshold range of the control voltage as shown by section 140 of the fifth curve 112. Therefore, the capacitance controller generates a second capacitance switching command as depicted by a point 142 in sixth curve 114. The second capacitance switching command triggers the control switch to switch to the non-conducting state from the conducting state. The change in state of the control switch to the non-conducting state facilitates to operatively separate the second capacitive element from the power converter, thereby reducing the total capacitance of the power converter. The reduction of the total capacitance facilitates the frequency controller to increase the switching frequency of the power converter as shown by section 144 of the first curve 88, which also increases the control voltage to be within the threshold range of the control parameter as shown by section 146 of the fifth curve 112.

Thus, the capacitance controller controls the power converter to maintain the switching frequency within a predetermined range by controlling the control parameter based on the total capacitance of the power converter.

Figure 3:
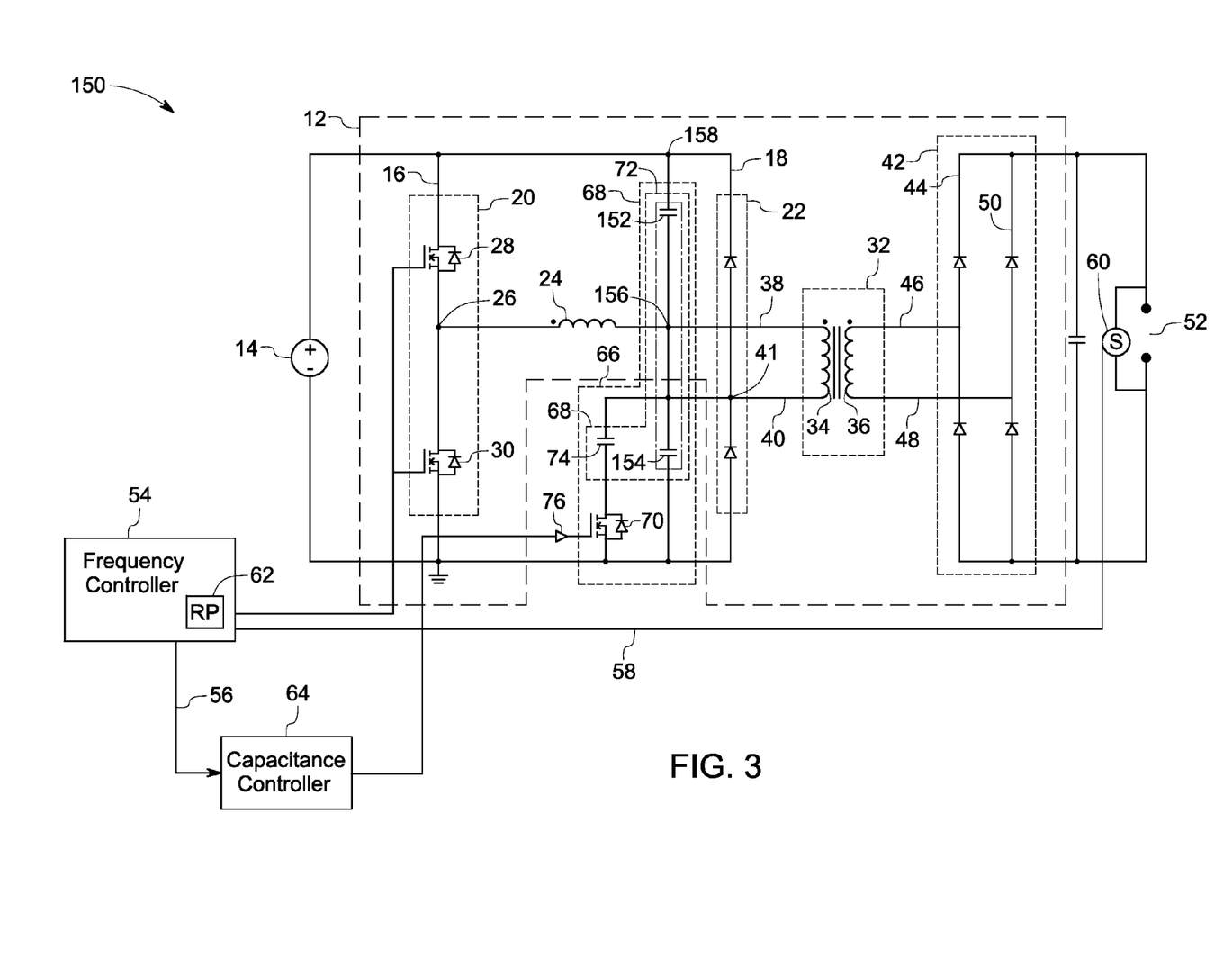
FIG. 3 is a schematic representation of a universal power adapter in accordance with another embodiment of the invention.

FIG. 3 is a schematic representation of another embodiment of a universal power adapter 150 in accordance with an embodiment of the invention. The universal power adapter 150 is substantially similar to the universal power adapter 10 of FIG. 1. In the illustrated embodiment, the first capacitive element 72 in the universal power adapter is split into a first capacitor 152 and a second capacitor 154 operatively coupled to each other in a series configuration at a third node 156. The first capacitor 152 is operatively coupled to the third node 156 and an input rail 158 of the power converter 12. The second capacitor 154 is operatively coupled to the third node 156 and ground 160. Such a configuration of the first capacitor 152 and the second capacitor 154 facilitates minimization of switching ripple and improves response of the power converter 12 towards line voltage variations and load variations.

Figure 4:
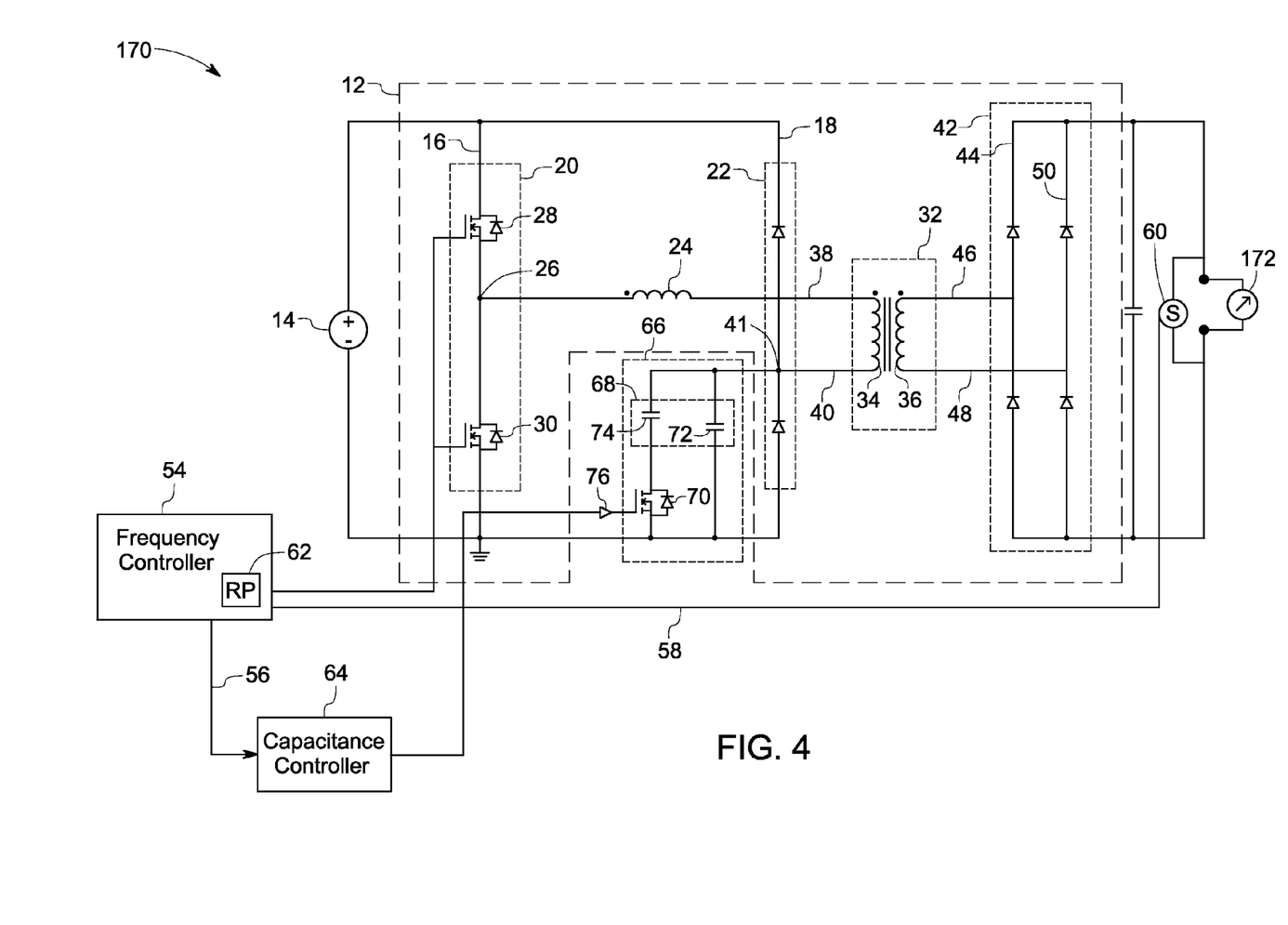
FIG. 4 is a schematic representation of a lighting system including a universal power adapter and an illumination device in accordance with an embodiment of the invention.

FIG. 4 is a schematic representation of a lighting system 170 including the universal power adapter 10 and an illumination device 172 operatively coupled to the universal power adapter 10. The illumination device 172 is operatively coupled to the output terminal 52 of the universal power adapter 10 and the universal power adapter 10 provides the output power to the illumination device 172 for illumination. In one embodiment, the universal power adapter 150 of FIG. 3 may also be used in the lighting system 170. In another embodiment, the illumination device may include a lighting emitting diode (LED). In yet another embodiment, a string of LED's may also be coupled to the universal power adapter 10.

Figure 5:
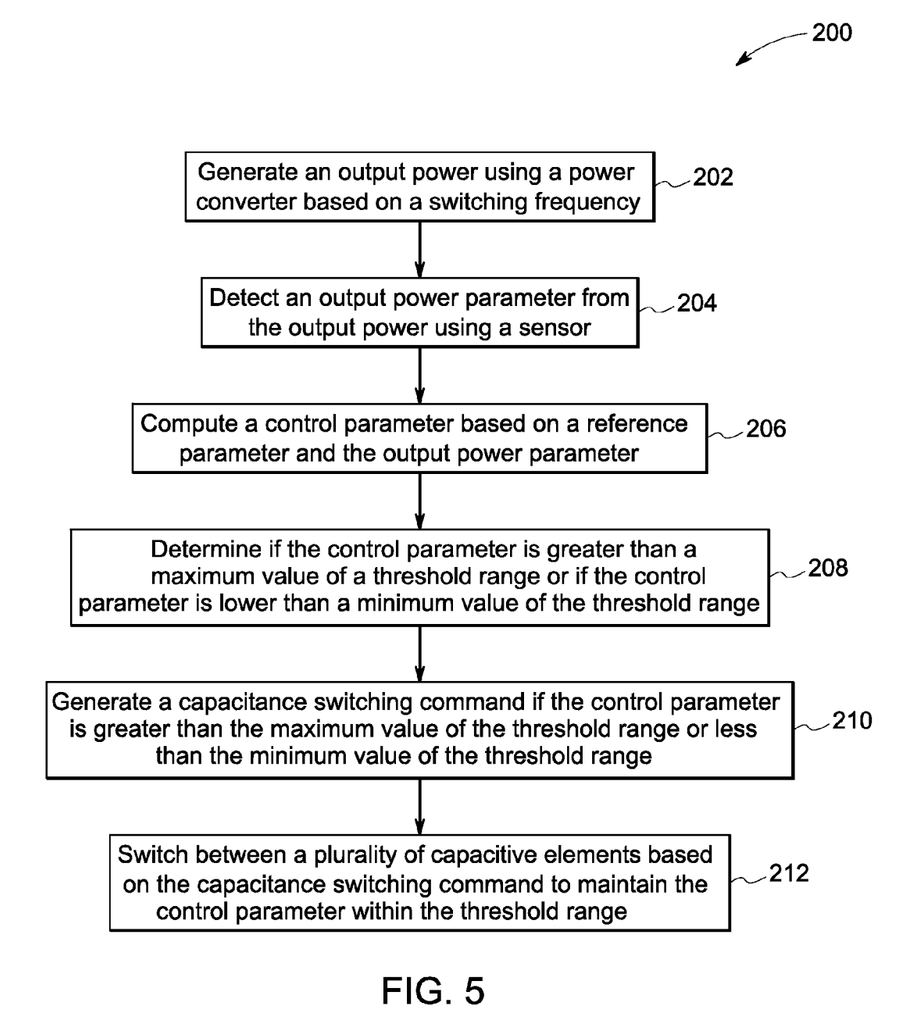
FIG. 5 is a flow chart representing steps involved in a method for providing power from a universal power adapter in accordance with an embodiment of the invention.

FIG. 5 is a flow chart representing steps involved in a method 200 for providing power from a universal power adapter in accordance with an embodiment of the invention. The method 200 includes generating an output power using a power converter based on the switching frequency of the power converter as represented in step 202. The method 200 also includes detecting an output power parameter from the output power, using a sensor as represented in step 204. The method 200 further includes computing a control parameter based on a reference parameter and the output power parameter as represented in step 206. The method 200 also includes determining if the control parameter is greater than a maximum value of a threshold range or less than a minimum value of the threshold range as represented in step 208. In one embodiment, the control parameter is representative of a control voltage or a control current, the reference parameter is representative of a reference voltage or a reference current, and the output power parameter is representative of an output voltage or an output current. The threshold range of the control parameter is determined based on a predetermined range of the switching frequency of the power converter The method 200 further includes generating a capacitance switching command if the control parameter is greater than the maximum value of the threshold range or if the control parameter is less than the minimum value of the threshold range as represented in step 210. In one embodiment, the method 200 also includes altering the switching frequency of the power converter if the control parameter is within the threshold range. The method 200 further includes switching between a first capacitive element and a second capacitive element based on the capacitance switching command to maintain the control parameter within the threshold range as represented in step 212.

The exemplary embodiments of the universal power adapter and the method described hereinabove aid in operating the universal power adapter over a wide range of an input voltage and an output voltage. The universal power adapter includes a switch capacitor circuit that enables the universal power adapter to provide output power to different loads having different power ratings. Moreover, the switch capacitor circuit enables the universal power adapter to provide output power at different input voltages from various power sources.

It is to be understood that a skilled artisan will recognize the interchangeability of various features from different embodiments and that the various features described, as well as other known equivalents for each feature, may be mixed and matched by one of ordinary skill in this art to construct additional systems and techniques in accordance with principles of this specification. It is, therefore, to be understood that the appended claims are intended to cover all such modifications and changes as fall within the true spirit of the invention.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A universal power adapter comprising:
   a power converter configured to generate an output power based on a switching frequency of the power converter,
   a frequency controller operatively coupled to the power converter and configured to control the switching frequency of the power converter;
   a switch capacitor circuit comprising a plurality of capacitive elements, operatively coupled to the power converter, wherein the switch capacitor circuit is configured to switch between the plurality of capacitive elements; and
   a capacitance controller operatively coupled to the switch capacitor circuit and configured to control the switch capacitor circuit to control switching between the plurality of capacitive elements to maintain a control parameter within a threshold range.

2. The universal power adapter of claim 1, wherein the power converter comprises:
   a first string comprising a plurality of switches operatively coupled to each other in a series configuration;
   a second string comprising a plurality of diodes operatively coupled to each other in a series configuration;
   a transformer comprising a primary winding and a secondary winding, wherein the primary winding comprises a first end operatively coupled to the first string at a first node and a second end operatively coupled to the second string at a second node; and
   a rectifier operatively coupled to the secondary winding, wherein the rectifier comprises a first leg operatively coupled to a first end of the secondary winding and a second leg operatively coupled to a second end of the secondary winding.

3. The universal power adapter of claim 2, wherein the first string and the second string are operatively coupled to each other in a parallel configuration.

4. The universal power adapter of claim 2, wherein the primary winding and the secondary winding comprise a predetermined ratio of turns.

5. The universal power adapter of claim 2, further comprising a resonant inductor operatively coupled to the first string at the first node and to the first end of the primary winding in a series configuration.

6. The universal power adapter of claim 1, wherein the switch capacitor circuit comprises:
   a first capacitive element operatively coupled to an end of a primary winding;
   a second capacitive element operatively coupled to the end of the primary winding; and
   a control switch operatively coupled to the first capacitive element and the second capacitive element and configured to switch between the first capacitive element and the second capacitive element.

7. The universal power adapter of claim 6, wherein the first capacitive element and the second capacitive element comprise a predetermined ratio of capacitance.

8. The universal power adapter of claim 6, wherein the first capacitive element comprises a first capacitor and the second capacitive element comprises a second capacitor, wherein the first capacitor and the second capacitor are operatively coupled to each other in a series configuration.

9. The universal power adapter of claim 6, wherein the first capacitive element and the second capacitive element are operatively coupled to the second end of the primary winding in a parallel configuration.

10. The universal power adapter of claim 1, wherein the frequency controller is configured to generate the control parameter based at least on an output power parameter detected by a sensor, wherein the output power parameter comprises an output voltage or an output current.

11. The universal power adapter of claim 10, wherein the control parameter is computed based on a reference parameter and the output power parameter.

12. The universal power adapter of claim 10, wherein the capacitance controller is configured to control a control switch based on the control parameter received from the frequency controller.

13. The universal power adapter of claim 1, wherein the capacitance controller is configured to generate a capacitance switching command based on a comparison of the control parameter with the threshold range.

14. The universal power adapter of claim 1, wherein the control parameter comprises a control voltage or a control current.

15. The universal power adapter of claim 1, wherein the capacitance controller may be integrated with the frequency controller.

16. A method for providing an output power from a universal power adapter, the method comprising:
   generating the output power, using a power converter, based on a switching frequency of the power converter;
   detecting an output power parameter from the output power, using a sensor;
   computing a control parameter based on a reference parameter and the output power parameter;
   determining if the control parameter is greater than a maximum value of a threshold range or less than a minimum value of the threshold range;
   generating a capacitance switching command if the control parameter is greater than the maximum value of the threshold range or less than the minimum value of the threshold range; and
   switching between a plurality of capacitive elements based on the capacitance switching command to maintain the control parameter within the threshold range.

17. The method of claim 16, wherein the control parameter is representative of a control voltage or a control current, the reference parameter is representative of a reference voltage or a reference current, and the output power parameter is representative of an output voltage or an output current.

18. The method of claim 16, further comprising determining the threshold range of the control parameter based on a predetermined range of the switching frequency of the power converter.

19. The method of claim 16, further comprising altering the switching frequency of the power converter if the control parameter is within the threshold range of the control parameter.

20. A lighting system comprising:
   a universal power adapter comprising:
      a power converter configured to generate an output power based on a switching frequency of the power converter,
      a frequency controller operatively coupled to the power converter and configured to control the switching frequency of the power converter;
      a switch capacitor circuit comprising a plurality of capacitive elements, operatively coupled to the power converter, wherein the switch capacitor circuit is configured to switch between the plurality of capacitive elements;
      a capacitance controller operatively coupled to the switch capacitor circuit and configured to control the switch capacitor circuit to control switching between the plurality of capacitive elements to maintain a control parameter within a threshold range; and
   an illumination device operatively coupled to the universal power adapter, wherein the universal power adapter is configured to provide the output power to the illumination device.

\* \* \* \* \*